Patented Oct. 27, 1942

2,299,826

UNITED STATES PATENT OFFICE 2,299,826

VAT DYESTUFFS OF THE FLUORANTHENE SERIES AND PROCESS OF PREPARING SAME

Walter Kern, Sissach, and Theodor Holbro and Richard Tobler, Riehen, Switzerland, assignors to Society of Chemical Industry in Basle, Basel, Switzerland No Drawing. Application August 22, 1939, Serial No. 291,426. In Switzerland August 27, 1938

12 Claims. (Cl. 260—368)

This invention relates to the manufacture of valuable vat-dyestuffs of the fluoranthene series by causing fluoranthenes containing at least one carboxyl group, if desired after conversion of the carboxyl group in known manner into a reactive derivative, for instance a halide to react with such compounds as contain at least one reactive hydrogen atom united to a nitrogen atom and of which at least one contains the radical of a compound capable of being vatted.

The fluoranthene carboxylic acids serving as parent materials for the invention may be obtained for instance by causing a dibromo- or tribromofluoranthene to react with cuprous cyanide and saponifying the fluoranthene nitrile thus obtained, for example by means of alcoholic alkali solution. Details of the necessary procedure for this mode of producing the carboxylic acids may be found in U. S. A. application Serial No. 291,427, filed August 22, 1939.

These fluoranthene carboxylic acids which may contain further nuclear substituents, for instance halogen, are used for the reaction preferably in the form of a reactive derivative, for instance an acid halide.

Compounds which contain at least one hydrogen atom united to a nitrogen atom are for example aliphatic, hydroaromatic and aromatic amines, such as methylamine, ethylamine, cyclohexylamine, aniline and its homologues, α- and β-naphthylamines. Compounds which contain besides a radical of a compound capable of being vatted, for instance at least one cyclic bound carbonyl group may be anthraquinone derivatives or compounds belonging to more highly condensed ring-systems. Such amines are for example 1-amino-4-benzoylaminoanthraquinone, 1-amino-5-benzoylaminoanthraquinone, 1-amino-5-benzoylamino - 8 - methoxyanthraquinone, 1 - aminoanthraquinone, 1-amino-4-methoxyanthraquinone, 2-aminoanthraquinone, aminopyranthrones, aminodibenzanthrones, aminoflavanthrones, aminobenzanthrones, aminodianthrones, aminoanthanthrones, 1 - aminoanthraquinones - 2 - carboxylic acid, 1-aminoanthraquinone-2 - carboxylic acid ethyl ester, amino - N - dihydroanthraquinoneazines, aminodibenzpyrenequinones, amino-1:9-anthrapyrimidines, amino-1:9-anthrapyridones, amino-1:9-isothiazolanthrones, amino-1:9-pyrazolanthrones, 4- or 5-amino-1:2-anthraquinoneacridone as well as substitution products of these bodies, for instance such as contain halogen, alkyl or sulfo-groups. In case of fluoranthene carboxylic acids containing several carboxyl groups or halides of these, for instance chlorides, more than one molecule of the same or different compounds of the kind just recited may be caused to react with one molecule of the poly-carboxylic acid or derivative thereof and such action may occur simultaneously or successively for each molecule.

It may be of advantage to use such compounds capable of being vatted as contain for instance in ortho-position to the reactive primary or secondary amino-group at least one substituent which can give rise to the formation of a heterocyclic ring. Such substituents are for example hydroxyl-, nitro-, mercapto- or amino-groups, also halogen atoms. Depending upon the conditions of working, the oxazole-, thiazole- or imidazole-rings may be formed in direct sequence on the action of the reactive fluoranthene carboxylic acid derivative, especially halide, with or without use of a special condensing agent; or if desired it may be formed in a further operation by any known process. Thus oxazoles may be obtained for example from fluoranthene carboxylic acid chlorides and ortho - hydroxyaminoanthraquinones, for example 2-hydroxy-1 - aminoanthraquinone with elimination of hydrogen halide and water, from fluoranthene carboxylic acid chlorides and ortho-nitro-aminoanthraquinones (for example 2-nitro - 1 - aminoanthraquinone) with elimination of hydrogen halide and nitrous acid with the use of bromamino-, for example 1:2-anthraquinones with elimination of hydrogen chloride and hydrogen bromide.

Thiazoles may be obtained for example when fluoranthene carboxylic acid chlorides are caused to react with ortho-mercapto-aminoanthraquinones, for example 1:2- and 2:1-mercaptoaminoanthraquinone. Finally imidazoles may be obtained by reaction of the same reactive fluoranthene carboxylic acid derivatives with ortho-diaminoanthraquinones or with ortho-nitro-aminoanthraquinones with reduction of the nitrogroup or with ortho - halogenaminoanthraquinones, in particular with a halogen atom in α-position after reaction with ammonia or a primary amine.

In all these instances products are obtained in which a fluoranthene radical is connected with at least one radical of a compound capable of being vatted by means of a five-membered heterocyclic ring system (in which the radical of the said compound capable of being vatted, e. g. an anthraquinone radical, takes part with two adjacent carbon atoms) containing the configuration —C—N—, whereby of course double bonds may be present, the sequence of atoms being always the same.

The reaction of the fluoranthene carboxylic acid or its reactive derivative, the isolation of which in many cases is not necessary, with the amine which contains at least one reactive hydrogen atom is preferably brought about by heating the components together in a solvent or diluent, for instance di- or tri-chlorobenzene, nitrobenzene, naphthalene or chloronaphthalene, whereby as stated above there is a further action in many cases involving ring-closure.

The condensation products obtainable by the process may be treated with condensing agents and/or substituting agents, whereby further valuable products are obtainable. As such agents may be named for example alkylating agents, halogens and agents yielding halogen and aluminium halides, if desired in the presence of a tertiary base, for instance pyridine or of potassium or sodium chloride.

The new products may be purified by one or more crystallizations from water or an organic solvent or by conversion into a salt with a strong acid or by treatment with an oxidizing agent, for instance alkali hypochlorite solution, sodium nitrite solution in an acid medium or a perborate solution. They may be converted by known methods into the leuco-derivatives, for instance leuco sulfuric acid esters.

The products of the invention are valuable dyestuffs which may be used for example for dyeing and printing vegetable and animal fibers, for instance cotton and wool. The dyeings and prints produced therewith exhibit excellent fastness to washing, chlorine and kier boiling.

The following examples illustrate the invention, the parts being by weight:

*Example 1*

12.5 parts of fluoranthene-4-carboxylic acid made as described in Annalen der Chemie, vol. 488, page 111, are suspended in 400 parts of dry ortho-dichlorobenzene and the solution is stirred with 12 parts of thionyl chloride for 1 hour at 110–120° C. 40 parts of the mass are now distilled, whereby the dichlorobenzene carries over the excess of thionyl chloride. The remaining solution containing the fluoranthene-4-carboxylic acid chloride is allowed to cool to 150° C. and there are added 22.3 parts of α-aminoanthraquinone and stirring is renewed and continued for 3 hours at 150–160° C. After cooling the dyestuff produced is filtered by suction. It is a yellow brown powder of the probable formula

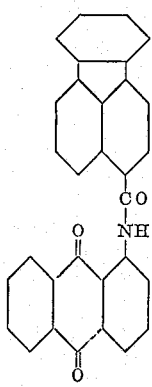

which melts at 295° C. with decomposition, dissolves in concentrated sulfuric acid to a red solution and dyes cotton yellow in a black-brown vat.

If 1-amino-5-benzoylaminoanthraquinone is used instead of α-aminoanthraquinone, there is obtained in the same manner a dyestuff which dissolves in concentrated sulfuric acid to a red solution and dyes cotton reddish-yellow in a black-brown vat.

*Example 2*

16.4 parts of fluoranthenedicarboxylic acid chloride are heated with 34.2 parts of 1-amino-4-benzoylaminoanthraquinone in 480 parts of dry nitrobenzene at 200° C. whilst stirring. The dyestuff which is obtained in excellent yield in filtered cold, washed with alcohol and dried. It is a red-brown crystalline powder of the probable formula

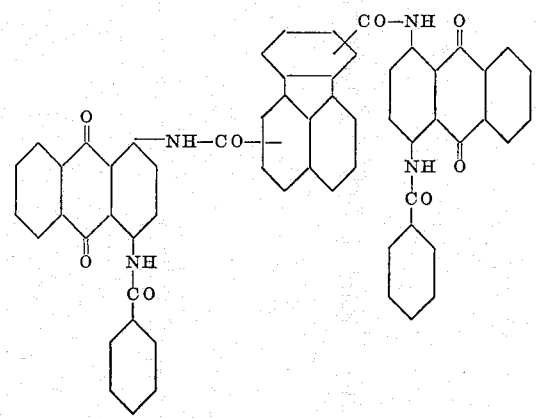

which decomposes when heated to about 400° C.; in sulfuric acid it dissolves to a red solution; it dyes cotton fast red in a black-brown vat.

The fluroanthenedicarboxylic acid chloride required for this example can be made as follows:

20 parts of finely powdered fluoranthenedicarboxylic acid obtainable as described in Example 2 of U. S. A. patent application Serial No. 291,427, filed August 22, 1939, are intimately mixed with 28.8 parts of phosphorous pentachloride, the mixture is heated to 90–100° C. until no more hydrogen chloride is evolved. The product is introduced into ice, treated with cold dilute sodium carbonate solution and then filtered, the solid matter being washed and dried. The fluoranthenedicarboxylic acid chloride thus obtained in excellent yield is a yellowish powder which melts at 200° C. with decomposition.

By the action of phosphorous pentachloride on fluoranthenedicarboxylic acid in trichlorobenzene at 150° C. there is obtained the same product.

*Example 3*

16.4 parts of fluoranthenedicarboxylic acid chloride are condensed with 34.2 parts of 1-amino-5-benzoylaminoanthraquinone in manner analogous to that described in Example 2, whereby there is obtained a good yield of brown powder of the probable formula

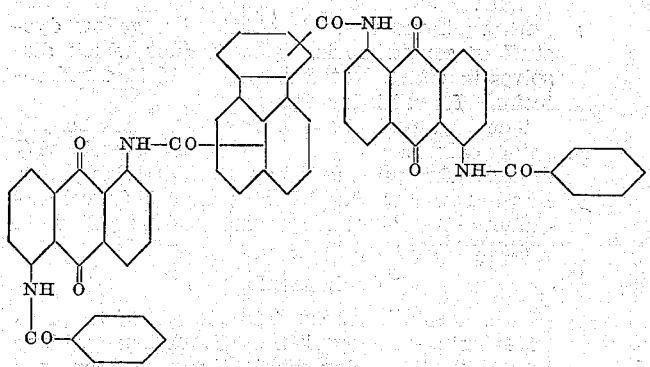

which dissolves in concentrated sulfuric acid to a red solution, does not melt at 450° C. and dyes cotton in a violet-brown vat strong yellow very fast tints.

By recrystallization from 1-chloronaphthalene or by aftertreatment of a fine aqueous suspension of the dyestuff with dilute chloride of lime solution or chromic acid solution at a raised temperature, there is obtained a purer product.

*Example 4*

29 parts of fluoranthenedicarboxylic acid are converted into the acid chloride by heating them at 110–120° C. with 47.6 parts of thionyl chloride in 1500 parts of dry ortho-dichlorobenzene. After distilling the excess of thionyl chloride there is run in at 150° C. a hot solution of 45 parts of α-amino-anthraquinone in 1200 parts of ortho-dichlorobenzene. After stirring for 2 hours at 150–160° C. the formation of dyestuff is finished. The mass is filtered hot and the solid matter is washed with dichlorobenzene and with alcohol and dried. The dyestuff thus obtained in very good yield is a yellow powder soluble in concentrated sulfuric acid to a red solution, melting at 420° C. with decomposition and dyeing cotton in a red-brown vat greenish-yellow tints of very good properties of fastness. It corresponds probably to the formula

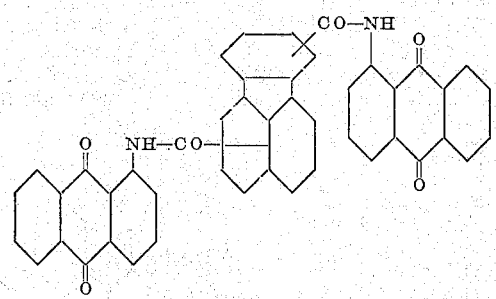

By halogenating this dyestuff in chlorosulfonic acid with 4 atoms of bromine in presence of some iodine at 0–5° C. there is obtained a dyestuff containing 2 atoms of bromine and dyeing cotton in a red-brown vat yellow tints.

In corresponding manner there may be obtained from 1 mol fluoranthenedicarboxylic acid and 2 mols of 1-amino-4-methoxyanthraquinone a dyestuff which is an orange powder, dissolves in concentrated sulfuric acid to an olive-brown solution and dyes cotton fast red-orange tints in a black-brown vat.

*Example 5*

Into a solution heated to 160° C. of fluoranthenedicarboxylic acid chloride in ortho-dichlorobenzene (obtainable by boiling a mixture of 14.5 parts of fluoranthenedicarboxylic acid and 15 parts of thionyl chloride with 800 parts of ortho-dichlorobenzene and distilling the excess of thionyl chloride) there is run a hot solution of 25.8 parts of 1-amino-6-chloranthraquinone in 700 parts of ortho-dichlorobenzene. After stirring for 2 hours at 160–170° C. the whole is boiled, the dyestuff which has separated is filtered at about 100° C. and then washed with ortho-dichlorobenzene and with alcohol and dried. It is a yellow powder soluble in concentrated sulfuric acid to a red solution and dyeing cotton in a brown vat yellow tints of high color strength, and corresponds probably to the formula

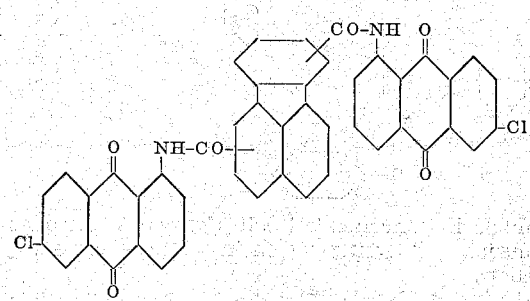

Similar dyestuffs are obtained from 1-amino-4-chloranthraquinone and 1-amino-5-chloranthraquinone.

*Example 6*

Into a solution heated to 150° C. of fluoranthenedicarboxylic acid chloride in dichlorobenzene (obtainable by boiling a mixture of 29 parts of fluoranthenedicarboxylic acid, 47.6 parts of thionyl chloride and 1500 parts of dichlorobenzene and distilling the excess of thionyl chloride) there is run a hot solution of 22.3 parts of α-aminoanthraquinone and 31 parts of 1-amino-4-phenylaminoanthraquinone in 150 parts of dichlorobenzene. After stirring for 2 hours at 150–160° C. the whole is boiled and then the dyestuff which has separated is filtered. The dyestuff is a greenish-black powder soluble in concentrated sulfuric acid to an olive-brown solution; it dyes cotton olive in a black brown vat. It corresponds probably to the formula

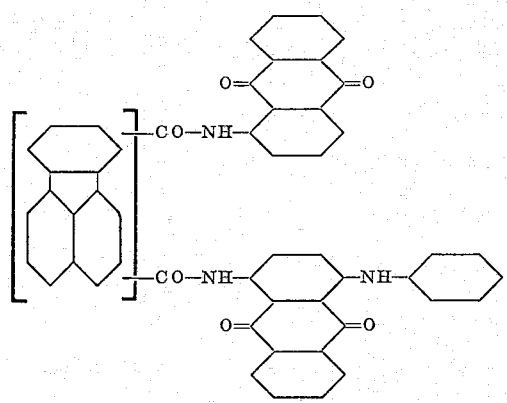

The condensation product obtained in similar manner from 1 mol fluoranthenedicarboxylic acid and 2 mols 1-amino-4-phenylamino-anthraquinone is a black-blue powder which dissolves in concentrated sulfuric acid to a grey-black solution and can be vatted only with difficulty.

*Example 7*

16 parts of fluoranthenedicarboxylic acid chloride and 37 parts of 1-amino-5-cinnamoylamino-anthraquinone are stirred with 400 parts of dry ortho-dichlorobenzene for 3 hours at 150-160° C. The mass is allowed to cool to 100° C. and the dyestuff which has been formed is filtered with suction It is a brown powder of the probable formula

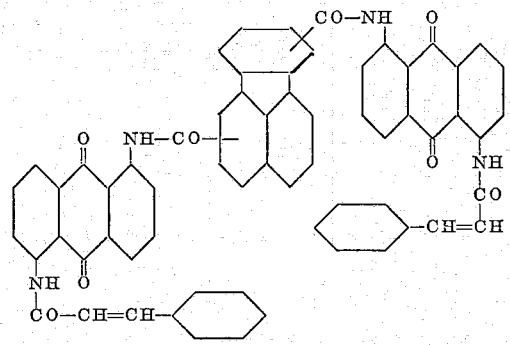

soluble in concentrated sulfuric acid to an olive solution and dyeing cotton in a black-brown vat yellow.

If instead of 1-amino-5-cinnamoylamino-anthraquinone there is used 1-amino-5-(para-methoxy)-benzoylaminoanthraquinone there is obtained a red-brown powder which dissolves in concentrated sulfuric acid to a red solution and dyes cotton reddish-yellow tints in a black-brown vat.

With 1-amino-5-(para-chloro)-benzoylamino-anthraquinone there is obtained a yellow dyestuff of somewhat less strong color which dissolves in concentrated sulfuric acid to a red solution. Its vat is brown.

The dyestuff from fluoranthenedicarboxylic acid chloroide and 1-amino-5-(β-pyridoyl)-aminoanthraquinone dyes cotton reddish-yellow in a brown vat; that from 1-amino-5-(β-anthraquinonoyl)-aminoanthraquinone dyes yellow in a black-brown vat.

*Example 8*

Into a solution heated to 150° C. of 34 parts of 4-amino-anthraquinone-1(N):2-benzacridone in 600 parts of dry dichlorobenzene there are introduced gradually 16 parts of fluoranthene dicarboxylic acid chloride. After 3 hours stirring at 150–155° C. the whole is boiled and filtered hot from the dyestuff which is separated. The latter is a blue crystalline powder of the probable formula which does not melt below 450° C.; it dissolves in concentrated sulfuric acid to an orange-red solution and dyes cotton blue-green in an olive vat.

If instead of 4-aminoanthraquinone-1(N):2-benzacridone there is used 5-aminoanthraquinone-1(N):2-benzacridone there is obtained a dyestuff which dyes cotton Bordeaux tints in a violet vat.

*Example 9*

16 parts of fluoranthenedicarboxylic acid chloride are brought into reaction with 42 parts of aminopyranthrone in manner analogous to that described in Example 8. There is obtained with excellent yield a black-brown powder of the probable formula which does not melt below 450° C., dissolves in concentrated sulfuric acid to a blue solution and dyes cotton black-olive tints in a blue-red vat.

In similar manner there is obtained from aminodibenzanthrone a black powder soluble in concentrated sulfuric acid to a violet-blue solution and dyeing cotton blackish-green in a blue vat.

The condensation product from 1 mol fluoranthenedicarboxylic acid chloride and 2 mols aminoanthanthrone is a brown powder which dissolves in concentrated sulfuric acid to a blue-green solution and dyes cotton reddish-brown in a violet vat.

*Example 10*

Into a solution heated to 150° C. of 22.3 parts of β-aminoanthraquinone in 600 parts of dry dichlorobenzene there are introduced 16.4 parts of fluoranthenedicarboxylic acid chloride. After heating for 3 hours at 150-155° C. the dyestuff which has separated is filtered. It is a yellowish powder which dissolves in concentrated sulfuric acid to a red-brown solution and dyes cotton yellow in a yellow-brown vat. It corresponds probably to the formula

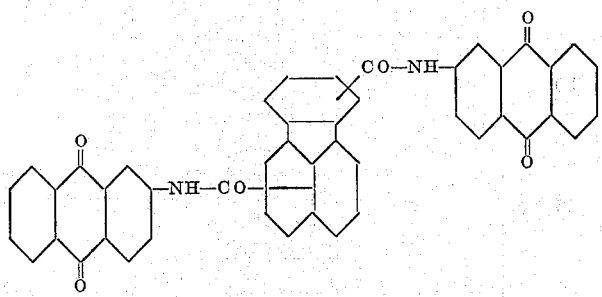

With 1-methylamino-4-bromanthraquinone there is obtained a dyestuff which dyes cotton yellow-olive tints in a red-brown vat. A solution of the dyestuff in concentrated sulfuric acid is red.

*Example 11*

16 parts of fluoranthenedicarboxylic acid chloride are brought into reaction with 28 parts of 4-amino-(N)-methyl-1:9-anthrapyridone in manner analogous to that described in Example 10. There is thus obtained a brown powder of the probable formula

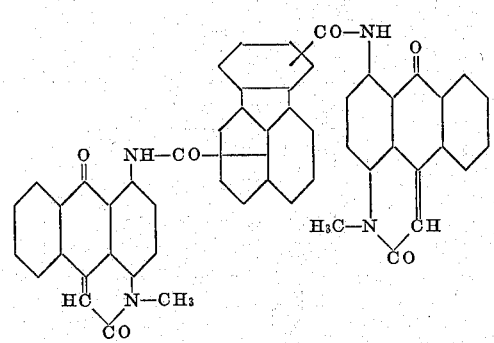

soluble in concentrated sulfuric acid to a red solution and capable of being vatted only with difficulty.

With 4-amino-1:9-anthrapyrimidine there is obtained in similar manner a yellow powder, the solution of which in concentrated sulfuric acid is red; the powder dyes cotton greenish-yellow in a brown vat.

With 5-amino-1:9-anthrapyrimidine there is obtained a dyestuff which dyes cotton reddish-yellow in a brown vat. In concentrated sulfuric acid it dissolves to a red solution.

*Example 12*

29 parts of fluoranthenedicarboxylic acid are converted by boiling for 1 hour with 29 parts of thionyl chloride in 1000 parts of dry nitrobenzene into the acid chloride. After distilling the excess of thionyl chloride the mass is allowed to cool to 45-50° C., 9 parts of pyridine and 34.2 parts of finely powdered 1-amino-5-benzoylaminoanthraquinone are added and the whole is stirred at 45-55° C. until the reaction of the parent material is complete. The mass is then heated to 150° C. and there is run in a hot solution of 34.2 parts of 1-amino-4-benzoylaminoanthraquinone in 10 times its weight of dry nitrobenzene. After stirring for 2 hours at 145-155° C. the formation of dyestuff is complete. The precipitated dyestuff is filtered, washed with nitrobenzene and alcohol and dried. It is a red-brown powder of the probable formula

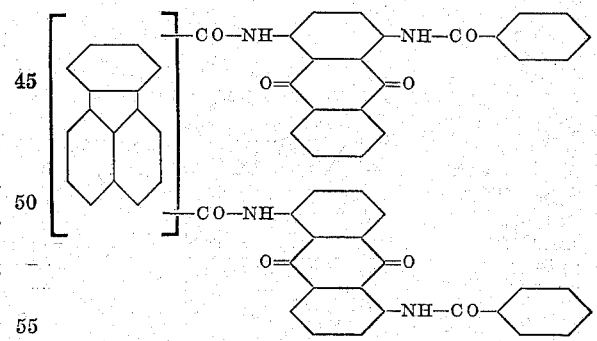

soluble in concentrated sulfuric acid to a red solution and dyeing cotton orange tints in a brown vat. If instead of a solution of 1-amino-4-benzoylaminoanthraquinone in nitrobenzene there are added 10 parts of aniline there is obtained a dyestuff which dyes cotton yellow tints in a violet-brown vat.

Instead of aniline other amines which are not capable of being vatted may be used, as indicated above, whereby similar dyestuffs are produced.

*Example 13*

22.4 parts of dibromofluoranthenedicarboxylic acid obtainable as described in Example 3 of U. S. A. patent application Serial No. 291,427, filed August 22, 1939, by brominating fluoranthene dicarboxylic acid in chlorosulfonic acid in presence of some iodine are converted into the acid chloride by addition of 20 parts of thionyl chloride in 1000 parts of ortho-dichlorobenzene and boiling the mixture for 1 hour. After distilling the excess of thionyl chloride there is run in at 150° C. a hot solution of 22.3 parts of α-aminoanthraquinone in 500 parts of ortho-dichlorobenzene. After stirring for 2 hours at 150–160° C. the dyestuff which has been precipitated is filtered at 100° C. and washed with dichlorobenzene and with alcohol. It is a yellow powder soluble in concentrated sulfuric acid to a red solution and dyeing cotton greenish yellow tints in a red-brown vat.

Example 14

Into 19.5 parts of fluoranthenetricarboxylic acid chloride (obtainable analogously to the manufacture of fluoranthenedicarboxylic acid chloride; see Example 2 or 4) in 1000 parts of ortho-dichlorobenzene there is run a hot solution of 51.3 parts of 1-amino-5-benzoylaminoanthraquinone in 1000 parts of dichlorobenzene. After boiling for 2 hours at 150–160° C. the whole is filtered and the solid dyestuff washed with dichlorobenzene and with alcohol. It is a brown powder of the probable formula

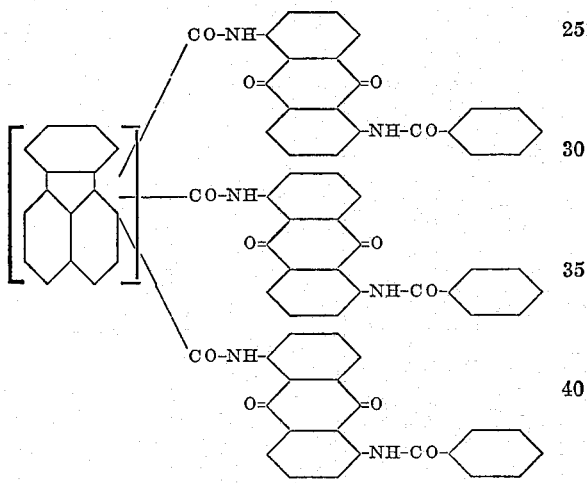

soluble in concentrated sulfuric acid to a red solution and dyeing cotton yellow in a violet-brown vat.

Fluoranthenetricarboxylic acid may be made by the reaction of tribromofluoranthene with cuprous cyanide in benzylcyanide and saponifying the nitrile thus produced with alcoholic potash solution as described in Example 4 of U. S. A. patent application Serial No. 291,427, filed August 22, 1939.

Example 15

5.8 parts of fluoranthenedicarboxylic acid are converted into the acid chloride by boiling them for 1 hour with 9.5 parts of thionyl chloride in 360 parts of dry nitrobenzene. After distilling the excess of thionyl chloride there is run in at 150° C. a hot solution of 9.53 parts of 1:2-diaminoanthraquinone in 300 parts of dry nitrobenzene. After stirring for 2 hours at 150–160° C. at the boiling temperature the whole is filtered and the solid matter is washed with nitrobenzene and with alcohol and dried. The dyestuff thus obtained is a brown powder which does not melt below 450° C., dissolves in concentrated sulfuric acid to a red solution and dyes cotton orange-brown tints of strong color in a black-brown vat. It probably contains 2 imidazole rings.

By after-treatment of a fine aqueous suspension of the dyestuff with dilute chloride of lime solution at a raised temperature a purer product is obtained.

Example 16

5.8 parts of fluoranthenedicarboxylic acid are converted into the acid chloride by the process described in Example 4 and the chloride is caused to react with 10.3 parts of 1-chloro-2-aminoanthraquinone. There is obtained in good yield a greenish powder of the probable formula

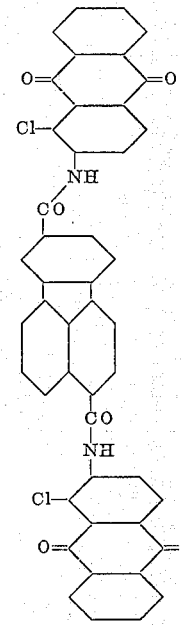

soluble in concentrated sulfuric acid to a dark yellow solution and vatted only with great difficulty.

Example 17

3.85 parts of the product obtained in Example 16 from 1 mol of fluoranthenedicarboxylic acid chloride and 2 mols of 1-chloro-2-aminoanthraquinone, 3 parts of anhydrous sodium acetate and 0.15 part of cuprous chloride are together heated to boiling in 50 parts of aniline for 15 hours while stirring. The product which has separated is filtered hot, washed with aniline and with alcohol, extracted with boiling dilute hydrochloric acid, filtered, washed and dried. The dyestuff thus obtained is a yellow powder soluble in concentrated sulfuric acid to a red solution and dyes cotton yellow in a red-brown vat. It may be supposed to have the following constitution:

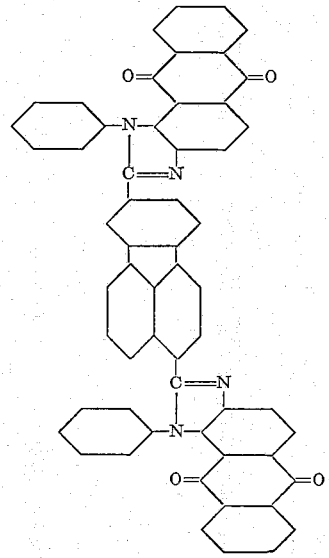

Example 18

3.85 parts of the product obtained in Example 16 from 1 mol of fluoranthenedicarboxylic acid chloride and 2 mols of 1-chloro-2-aminoanthraquinone, 2.23 parts of 1-aminoanthraquinone, 3 parts of anhydrous sodium acetate and 0.15 part of cuprous chloride are mixed in 60 parts of dry nitrobenzene and the whole is boiled, while stirring, for 15 hours. The precipitated dyestuff is filtered hot, washed with nitrobenzene and with alcohol and extracted with boiling dilute hydrochloric acid. It is an olive-brown powder soluble in concentrated sulfuric acid to a brown-red solution and dyeing cotton yellow in a brown vat. It probably contains 2 imidazole rings.

Example 19

2.9 parts of fluoranthenedicarboxylic acid are converted into the acid chloride by boiling them together with 2.9 parts of thionyl chloride in 200 parts of dry nitrobenzene. After distilling the excess of thionyl chloride there are added at 170–180° C. 5.54 parts of the sodium salt of 1-mercapto-2-aminoanthraquinone and the whole is stirred for 8 hours at 200° C. The dyestuff thus produced is filtered, washed with nitrobenzene and with alcohol, mixed with ethylcarbazole and the mixture is heated to boiling for a short time to complete the ring closure.

The dyestuff is an olive-brown powder soluble in concentrated sulfuric acid to a red solution and dyeing cotton yellow-brown tints in a black-brown vat. It probably has the following constitution:

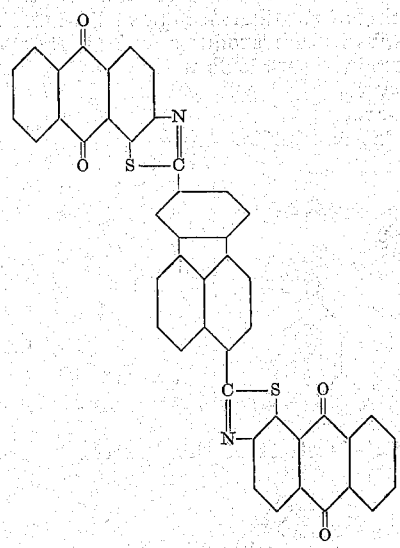

Example 20

14.5 parts of fluoranthenedicarboxylic acid are converted into the acid chloride by boiling them for one hour with 14.5 parts of thionyl chloride in 900 parts of dry nitrobenzene. After distilling the excess of thionyl chloride there is allowed to flow in at 170° C. a hot solution of 38.1 parts of 1:3-dibromo-2-aminoanthraquinone in 900 parts of dry nitrobenzene. The whole is boiled until the formation of dyestuff is complete, whereupon the latter is filtered and washed with nitrobenzene and with alcohol. It is a yellow-brown powder soluble in concentrated sulfuric acid to an orange-red solution and dyeing cotton yellow in a violet-brown vat.

The dyestuff is probably of the following constitution:

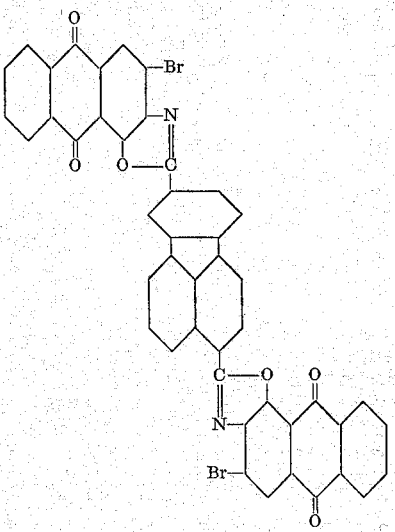

Example 21

A paste is made from the dyestuff made as described in Example 4, 1st paragraph, 6 parts by volume of caustic soda solution of 36° Bé. and 100 parts of water at 40–50° C., 2 parts of hydrosulfite are added and vatting is continued for ½ hour at the above temperature. In the dye-bath there are added 3 parts by volume of caustic soda solution of 36° Bé., 1 part of hydrosulfite and enough water including that in the stock vat to make 2000 parts by volume, whereupon the stock vat is added. 50 parts of cotton are then entered and are handled for ¼ hour and dyed for 1 hour at 50–60° C.; they are then wrung out, oxidized in air for ½ hour, rinsed, scoured and soaped at the boil. The cotton is dyed greenish-yellow tints.

Example 22

A paste is made from 0.5 part of the dyestuff of Example 3, first paragraph, 4 parts by volume of caustic soda solution of 36° Bé. and 100 parts of water at 25–30° C., 1 part of hydrosulfite conc. powder is added and the whole is vatted for ½ hour at the above temperature. The dyebath is prepared as follows:

900 parts by volume of liquor, 1 part by volume of caustic soda solution of 36° Bé., 0.5 part of hydrosulfite conc. Into this bath the vatted dyestuff is poured and dyeing is continued for 1 hour at 25–30° C. After ¼ hour of the dyeing 10 parts of common salt or calcined Glauber salt are added. When dyeing is complete the goods are wrung out and oxidized in the air, rinsed and developed at the boil for ½ hour with 5 parts of soap and 2 parts of calcined sodium carbonate per liter. The cotton is dyed fast yellow tints.

Example 23

A paste is made of 0.5 part of the dyestuff of Example 15 with 4.5 parts by volume of caustic soda solution of 36° Bé. and 100 parts of water at 50–60° C.; 1.2 parts of hydrosulfite are added and vatting is continued for ½ hour at the above temperature. To the dye-bath 1.5 parts by volume of caustic soda solution of 36° Bé. is added and 20 parts of cotton are entered, dyeing being continued for ¾ hour at 50–60° C.; the goods are wrung out, oxidized for ½ hour in the air, rinsed, scoured and soaped at the boil. The cotton is dyed very fast orange-brown tints.

The expressions a fluoranthene radical and fluoranthenes as used in the following claims are to be understood to mean products containing the ring system

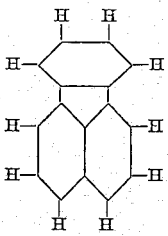

which may carry halogen as a substituent besides the groups indicated in the claims.

What we claim is:

1. Process for the manufacture of vat-dyestuffs comprising reacting a fluoranthene compound which is a member of the group consisting of the fluoranthene dicarboxylic acid halide, the fluoranthenetricarboxylic acid halide and their halogen substitution products, with compounds capable of being vatted, which contain at least three condensed six-membered carbon rings, further at least one carbonyl group the carbon atom of which is a member of a six-membered ring as well as at least one amino group selected from the class consisting of primary and secondary amino groups directly attached to a carbon atom of the condensed ring system.

2. Process for the manufacture of vat-dyestuffs, comprising reacting a fluoranthene compound which is a member of the group consisting of the fluoranthene dicarboxylic acid halide, the fluoranthene tricarboxylic acid halide and their halogen substitution products with aminoanthraquinones.

3. Process for the manufacture of vat-dyestuffs, comprising reacting a fluoranthene compound which is a member of the group consisting of the fluoranthene dicarboxylic acid halide, the fluoranthene tricarboxylic acid halide and their halogen substitution products with 1-aminoanthraquinones.

4. Process for the manufacture of vat-dyestuffs, comprising reacting a fluoranthene compound which is a member of the group consisting of the fluoranthene dicarboxylic acid halide, the fluoranthene tricarboxylic acid halide and their halogen substitution products with 1-aminoanthraquinones containing an acylamino-group.

5. Process for the manufacture of vat-dyestuffs, comprising reacting fluoranthene dicarboxylic acid chloride with two molecular proportions of 1-aminoanthraquinone.

6. Process for the manufacture of vat-dyestuffs, comprising reacting fluoranthene dicarboxylic acid chloride with two molecular proportions of 1-amino-5-benzoylaminoanthraquinone.

7. Vat-dyestuffs of the general formula $$R_1-(CO-NH-R_2)_n$$

wherein $n$ is at least 2 and at the most 3, $R_1$ stands for a member selected from the group consisting of the fluoranthene radical and its halogen substitution products, all $R_2$ stand for radicals of compounds capable of being vatted which contain at least three condensed six-membered carbon rings and at least one carbonyl group the carbon atom of which is a member of a six-membered ring.

8. Vat-dyestuffs of the general formula $$R_1-(CO-NH-R_3)_n$$

wherein $n$ is at least 2 and at the most three, $R_1$ stands for a member selected from the group consisting of the fluoranthene radical and its halogen substitution products and all $R_3$ stand for anthraquinone radicals.

9. Vat-dyestuffs of the general formula $$R_1-(CO-NH-R_3)_n$$

wherein $n$ is at least 2 and at the most three, $R_1$ stands for a member selected from the group consisting of the fluoranthene radical and its halogen substitution products and all $R_3$ stand for anthraquinone radicals united to the NH-groups in 1-position.

10. Vat-dyestuffs of the general formula $$R_1-(CO-NH-R_3)_n$$

wherein $n$ is as least 2 and at the most three, $R_1$ stands for a member selected from the group consisting of the fluoranthene radical and its halogen substitution products and all $R_3$ stand for anthraquinone radicals united to the NH-group in 1-position and containing at least one acylamino-group.

11. Vat-dyestuffs of the formula

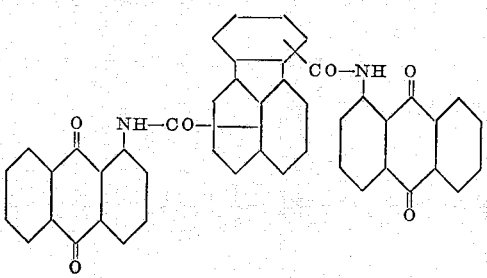

12. Vat-dyestuffs of the formula

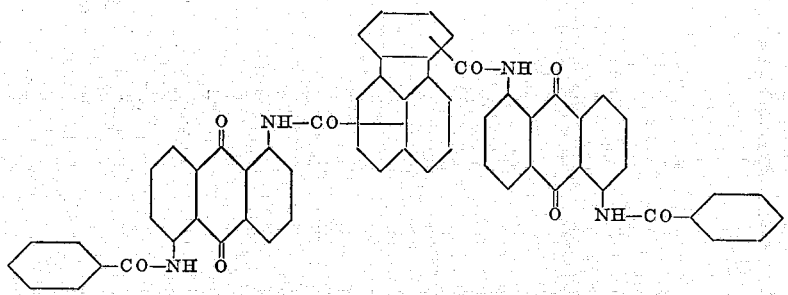

WALTER KERN.
THEODOR HOLBRO.
RICHARD TOBLER.